May 11, 1943.   T. O. KOSATKA   2,319,067
OIL SEAL
Filed July 16, 1941
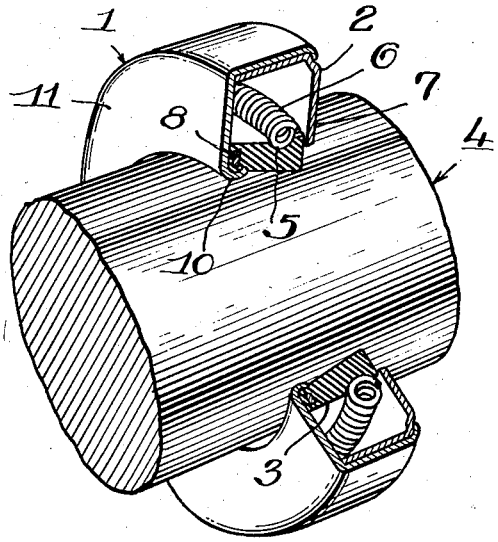
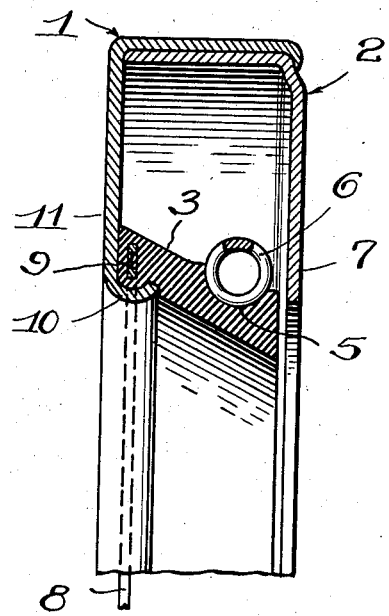
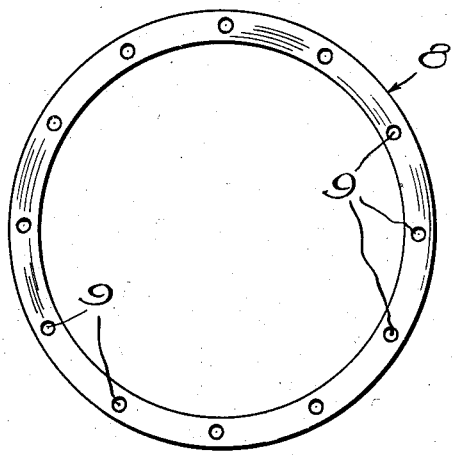
INVENTOR.
Thomas O. Kosatka,
BY Parkinson & Lane,
Attys.
Witness:
Chas. L. Hursh.

Patented May 11, 1943

2,319,067

UNITED STATES PATENT OFFICE 2,319,067

OIL SEAL

Thomas O. Kosatka, Chicago, Ill., assignor to Victor Manufacturing & Gasket Company, Chicago, Ill., a corporation of Illinois Application July 16, 1941, Serial No. 402,684

1 Claim. (Cl. 288—3)

The present invention relates to an oil seal or grease retainer and more particularly to a novel sealing element adapted to have a wiping contact with a rotatable shaft to prevent the escape or passage of lubricants such as oil or grease or other fluids including water and cooling liquids, as well as prevent the entrance of dust or other foreign particles.

The invention further comprehends a novel and simplified retaining means for anchoring the sealing element in a surrounding shell, the latter being adapted to be mounted within a housing or enclosure surrounding the shaft. In the present novel embodiment this retaining means consists of a metal washer provided with perforations for most effectively anchoring the plastic or resilient material of which the sealing element is composed. Such initially plastic material is preferably one of the synthetic rubbers which may be readily molded or vulcanized to the washer to form an integral unit.

Another important object of the present invention is the provision of a standardized sealing element adapted to be used with retaining shells that vary in diameter through a relatively wide range. This permits the manufacture of the sealing elements in large quantities and storage for future use, thereby greatly decreasing the cost of manufacture.

The invention further eliminates the disadvantages incident to the prior constructions in which the sealing member is clamped between the shell and a pressure exerting member. The present construction provides a most effective fluid sealing contact between the sealing element and the retaining shell, the sealing contact taking place both at the edge and bottom of the shell.

Further objects are to provide a construction of maximum simplicity, efficiency, economy and ease of assembly and operation, and such further objects, advantages and capabilities as will later more fully appear and are inherently possessed thereby.

The invention further resides in the construction, combination and arrangement of parts illustrated in the accompanying drawing, and while I have shown therein a preferred embodiment, it is to be understood that the same is susceptible of modification and change, and comprehends other details, arrangements of parts, features and constructions without departing from the spirit of the invention.

In the drawing:

Figure 1 is a view in perspective of the novel oil seal surrounding a rotatable shaft, with a portion of the retaining shell and sealing element broken away to more clearly disclose their construction.

Figure 2 is an enlarged view in vertical cross section through the oil seal.

Figure 3 is a view in side elevation of the perforated anchoring washer or ring.

Referring more particularly to the disclosure in the drawing, the novel embodiment therein selected to illustrate the invention comprises a substantially channel-shaped retaining shell consisting of an outer section 1 and an inner section 2 telescoped together and suitably crimped and interlocked to provide a substantially integral and unit assembly. Within this channel-shaped retaining shell is mounted a sealing element 3 molded in such manner as to provide a wiping contact with a rotatable shaft 4. In order to maintain such contact the rear face of this sealing element is molded with an annular recess 5 for the reception of a contractile or garter spring 6. By providing such a recess the garter spring is prevented from disengaging from the sealing element and is further prevented from becoming detached from the shell by the radially extending side 7 of the inner retaining section 2.

In order to positively retain and anchor the sealing element 3 within the shell, the invention comprehends employment of a washer or ring 8 preferably having a plurality of suitably spaced openings or perforations 9. This washer or ring is embodied in the plastic composition of the sealing element which is preferably of a synthetic rubber or the like, before the latter is molded, and due to its plasticity and flowability this material will flow into and through the perforations or openings 9 and around the washer 8 and integrally unite therewith to form the sealing element. The sealing element is then anchored in position by spinning or curling over the edge 10 of the side wall 11 of the outer section 1 to form an inturned lip or flange which becomes embedded or clinched within the sealing element as more clearly shown in Figure 2. This novel manner of anchoring the sealing element in position prevents any relative displacement between it and its retaining shell without bonding the sealing element to the shell or clamping it between the shell and a pressure exerting member. The result is a most simplified and efficient construction.

Having thus disclosed the invention, I claim:

An oil seal comprising a channel-shaped retaining shell, a substantially cylindrical sealing element of a moldable synthetic rubber extending substantially axially with a rotatable shaft and having one end free for wiping and sealing contact with said shaft, and means for anchoring the opposite end of the sealing element within the shell and comprising a perforated washer embedded within and extending transversely of the sealing element and with the transverse edge of the last mentioned end in fluid sealing contact with the interior of a side wall of the shell, and an inturned lip on the end of the last mentioned side wall of the retaining shell with the edge of the lip engaging and anchored in the sealing member adjacent an edge of the washer for retaining the sealing element in fluid-tight sealing engagement.

THOMAS O. KOSATKA.